United States Patent [19]
Kjelgaard et al.

[11] Patent Number: 6,045,654
[45] Date of Patent: Apr. 4, 2000

[54] METHOD FOR PRODUCING A PACKAGING LAMINATE WITH BARRIER PROPERTIES

[75] Inventors: Tom Kjelgaard, Lund; Ulf Ringdahl, Malmö; Katarina Magnusson, Södra Sandby, all of Sweden

[73] Assignee: Tetra Laval Holdings & Finance S.A., Pully, Switzerland

[21] Appl. No.: 08/983,589

[22] PCT Filed: May 29, 1996

[86] PCT No.: PCT/SE96/00687

§ 371 Date: Apr. 27, 1998

§ 102(e) Date: Apr. 27, 1998

[87] PCT Pub. No.: WO97/02142

PCT Pub. Date: Jan. 23, 1997

[30] Foreign Application Priority Data

Jul. 3, 1995 [SE] Sweden ................. 95023990

[51] Int. Cl.[7] ........................................... B32B 31/26
[52] U.S. Cl. ........................... 156/324; 156/244.24
[58] Field of Search ................... 156/244.24, 244.26, 156/244.27, 324

[56] References Cited

U.S. PATENT DOCUMENTS

| | | | |
|---|---|---|---|
| 3,648,834 | 3/1972 | Gifford | 156/244.24 |
| 3,762,598 | 10/1973 | Gayner | 156/257 |
| 4,308,084 | 12/1981 | Ohtusuki | 156/244.27 |
| 5,296,070 | 3/1994 | Take | 156/244.24 |
| 5,314,561 | 5/1994 | Komiya | 156/324 |
| 5,759,422 | 6/1998 | Schmelzer | 156/250 |

*Primary Examiner*—Daniel Stemmer
*Attorney, Agent, or Firm*—James Ray & Associates

[57] ABSTRACT

The invention relates to a method for fastening a barrier layer to an adjacent laminate layer in a package material. The fastening is performed by a partial adhesive being achieved in a first step and is completed by means of heat treatment in a subsequent step.

9 Claims, No Drawings

METHOD FOR PRODUCING A PACKAGING LAMINATE WITH BARRIER PROPERTIES

The present invention relates to a method for fastening two adjacent layers to each other in a package material, more specifically for fastening a barrier layer to an adjacent laminate layer in a package material.

A laminated package material in the form of a packaging laminate having a base layer of paper or cardboard, which gives the container strength and dimensional stability has for a long time been used within the packaging industry. The base layer in these known packaging laminates is often very thick and thereby confers the container good mechanical strength and dimensional stability. Outer thermoplastic layers on the other hand result in a liquid impervious container while they at the same time make it possible to convert the package material to containers by means of what is called heat sealing, in which thermoplastic layers facing each other while being supplied with heat and pressure are brought to surface fusion with each other in order to form mechanically strong and liquid impervious sealing joints.

A packaging laminate comprising only a base layer and polyethylene has good mechanical properties and good sealing properties against moisture and liquid but practically completely lacks barrier properties. In this connection a barrier layer means a laminate layer with good barrier properties against light, gases and/or flavouring agents.

In order to be able to use the packaging laminate in containers for e.g. light sensitive products the laminate thus has to be supplemented with at least one additional layer of a material with light barrier properties. In containers for such liquid foods as juice, wine, cooking oil, etc., a package material having good gas barrier properties is required. An often used gas barrier layer is a thin foil of aluminium which is applied against one side of the base layer. An Al foil is by itself completely oxygen im-permeable and has also other valuable barrier properties valuable for the filled product, e.g. light impermeability, while at the same time it is possible to accomplish im-pervious and mechanically strong splicings of the material by inductive heating during the conversion of the material to containers. Furthermore, an Al foil applied against the inside of the laminate must be covered with one or several plastic layers, usually polyethylene, in order to prevent contact between the aluminium foil and the later on filled food. Often the barrier layer cannot be bound directly to the base layer, but instead a good adhesion requires one or several intermediate binding layers.

An Al foil is not only an expensive material, but known package materials containing aluminium have several serious drawbacks. These depend to a large extent, and in certain cases completely, on the fact that the Al foil used as a barrier layer because of its low ability to stretch often ruptures in especially vulnerable areas of the material during the manufacturing of containers and in that way impairs the impermeability of the completed container. These known package materials also have drawbacks caused by the soaking paper or cardboard layers which rapidly loose their mechanical strength properties and make the container flabby and cumbersome when it is exposed to liquid or moisture. Furthermore, the paper or cardboard layer must be made relatively thick in order to give the container a necessary dimensional rigidity, which contributes to increasing the material load and thus the risk of crack formation in the Al foil during the manufacturing of containers.

When containers of the kind described above are manufactured the package material is often subjected to stresses which become especially great when the material is folded, since a folding results in tensions in the material due to the comparatively large thickness of the base layer. If the material in addition comprises a barrier layer which compared with plastic coatings has a very small tensile strength, the material then easily can rupture at the material folding.

The problem becomes aggravated when the material has to be folded along two intersecting crease lines (a so called cross). This is often the case in connection with external sealing areas which are always present on this type of containers (flexible material in the form of a sheet or a roll material intended for manufacture of a liquid impermeable packaging container with good dimensional rigidity) irrespective of being manufactured from a roll or from pre-manufactured blanks.

When parallelepipedical containers are formed the material thickness will in certain areas of the container amount to six times the laminate thickness. The outermost layers of the material will then be subjected to very high tensile stresses with accompanying stretchings and connected increased risks for ruptures in the barrier material.

A barrier material in the form of an aluminium foil is practically so little tensile that it cannot with guaranteed safety withstand those tensile stresses which the package material is subjected to during the manufacturing of containers. In the above mentioned specially vulnerable areas the tensile stresses on the Al foil are thus often so large that the Al foil cracks or ruptures with the above mentioned loss of impermeability and risk of leakage as a consequence in the completed container. The problem, which partly is connected with the thickness of the Al foil and to some extent can be mastered by making the Al foil thicker, is due to the fact that the Al foil together with the other layers arranged outside the Al foil, determined from the folding direction of the material, are forced to pass a longer distance than the corresponding length of the Al foil and said outer layer in a planar non-folded condition, respectively. The Al foil will thus together with these outer layers be subjected to tractive forces corresponding to those required in order to stretch the layers of the material the "surplus distance" which is caused by the folding. The plastic layers arranged outside the Al foil are usually elastic enough to be stretched the extra folding distance while the Al foil, on the contrary, only has a small ability to stretch and thus often cracks or ruptures when double or multiple layers of material are folded along two intersecting folding directions with the Al foil arranged on the side of the base layer which faces away from the folding direction.

The package materials described above thus have serious drawbacks, and new materials and methods are greatly demanded in order to eliminate the risk for crack formations or similar leakage damages.

One method of avoiding ruptures and crack formations in the Al foil has been to locally reduce the thickness of the base layer by removing material through milling or grinding in such risky areas in order to bring the Al foil closer to the folding centre for the purpose of reducing the tensile stresses on the Al foil. It is true that this solution works well in practice and makes it possible to manufacture folded containers with good gas impermeability properties, but at the same time it means a heavy loss of material and in that connection raised costs of materials.

Another known method of solving the problem with crack formation has been to control the folding of the container by means of a suitable number of crease lines in the package material in such a way that the folding of the material can be made less strained for the Al foil. However, this solution has proved to be very difficult to accomplish in practice.

A third known method consists of letting the tractive forces which the Al foil is exposed to be received by a binding layer situated inside the barrier layer, this layer being compressed as a consequence. However, this method has a drawback of the package material being considerably thicker, and the problems are accentuated at the double or multiple areas mentioned above.

The purpose of the invention is to provide a method of the kind mentioned above, which allows the manufacture of folded containers with good barrier properties from a packaging laminate.

In order to achieve this purpose the method according to the invention has the characterizing features of claim 1.

Apart from the usual other layers, the packaging laminate according to the invention has a barrier layer facing towards the inside of the packaging container contemplated. The barrier layer can be constructed to provide a barrier against light, taste and/or gas. It can be made of an inorganic material, such as aluminium (Al foil), an aluminium oxide coating and a silica coating. Such a barrier layer is usually formed as a thin layer, preferably up to a thickness of 25 vm. However, the inorganic layer can also be considerably thicker, i.e. more than 25 $\mu$m thick.

Alternatively, the barrier layer can comprise a more or less organic material, such as ethylene/vinyl alcohol, i.e. a copolymer of ethylene and vinyl alcohol (EVOH), polyvinyl alcohol, metalized (usually with aluminium) oriented polypropylene or metalized (usually with aluminium) oriented polyester, the polyester for example being polyethylene terephtalate.

The barrier layer is according to the invention covered with an adjacent laminate layer. Preferably, this layer consists of an adhesive plastic, for example polypropylene, which is chemically modified with maleic anhydride or acrylic acid. The adhesion of the laminate layer can according to known technique be improved by what is called treating by means of corona or ozone treatment.

A primer as a laminate layer can be a macromolecule, for example a polyurethane primer, an epoxy resin, an acrylate primer or primer which is hardened by exposure to UV or electron beams. The laminate layer can also be a lacquer. In this connection a lacquer means an non-pigmented liquid with an organic film forming substance which can be a natural resin, a synthetic resin or an oil.

An initiator for the chemical chain reaction hardening the lacquer can also be incorporated therein. The lacquer can also be hardened in other ways, for example by radiation, preferably by exposure to electrons.

The laminate layer is preferably arranged as an internal film for preventing contact between the barrier layer and the later on packed filling material. The laminate layer can of course also be applied on that side of the barrier layer which is facing the container or on both sides of the barrier layer.

The laminate layer is according to the invention first fastened to a free side of the barrier layer, and as a result an adhesive is achieved between the both layers, which becomes sufficiently strong so that the packaging laminate will be able to resist those stresses which the material is subjected to during the manufacturing of containers. At the same time the adhesive has to be so small that the packaging laminate is not subjected to the above mentioned tensions and stresses in the material which becomes particularly great during the folding, thermoforming or other mechanical treatment of the material.

The adhesive can be accomplished either by pasting, heat lamination or extrusion. When pasting is used the paste (dissolved in water or an organic solvent) is applied on one of the layers which then is dried and pressed against the other layer. The laminate layer can also be supplied as a film of paste in the form of the above mentioned macromolecules dissolved or dispersed in a solvent, the solvent or the dispersing agent, respectively, then being evaporated. By using a suitable material in the laminate layer as well as a solvent or dispersing agent the adhesive can be adapted in such a way that it will be sufficient for a further shaping of the packaging laminate to a more or less completed container. The adhesive by pasting is preferably controlled by varying the speed of the laminate web through a drying oven.

The two layers in the laminate can also adhere to each other by extrusion, i.e. one of the layers is extruded when it still is molten, when appropriate by coextrusion, i.e. the two layers are extruded at the same time. The procedure is well known to a person skilled in the art. The adhesive is in this case also controlled by the speed of the laminate web.

After the elimination of the above mentioned tensions and stresses in the packaging laminate by an additional treatment of the same the partial fastening by means of the above described adhesive is completed. This can be accomplished by heat treatment by means of moist as well as dry heat. When the adhesive is performed by means of pasting dry heat is preferred, and when the adhesive is performed by means of extrusion moist heat is preferred, preferably by means of autoclaving.

The risk for crack formation in the packaging laminate, mainly in its barrier layer, increases with a stronger adhesion to the laminate layer. It is thus an advantage to be able to form and fold a container with the desired impermeability properties for the product in question while the adhesive still is low to the laminate disposed for cracking. On an following completion of the fastening the container can be locked in its final form by means of a strong adhesion.

The partial fastening by adhesive in a first step and its completion by heat treatment in a following step is of course dependent on the material in the barrier layer as well as the material in the laminate layer. During extrusion by means of a known technique the procedure is adjusted in such a way that the laminate layer does not reach a certain temperature which is dependent on the extruded component for the layer. This can be achieved by changing the extrusion velocity and/or the extrusion temperature. The laminate layer is thus applied as a hot molten mass which rapidly bonds upon cooling of the layers.

When for example an adhesion plastic in the form of modified polypropylene as laminate layer is extruded on a barrier layer of an aluminium foil the extrusion is adjusted in such a way that the plastic melts, which results in that only an adherence is achieved. The fastening is then completed by raising the temperature during a varying period. At the same a pressure can be applied on the package material, but this is not always necessary. In this connection an autoclave is preferably used. However, an oven can also be applicable.

When a fastening procedure is used as described above an adhesive between the barrier layer and the laminate layer is achieved upon extrusion, which should lie within the adhesion interval of 100 to 500 N/m when measured in an Instron tensile stress device. After the completion of the fastening the adhesion interval should lie within 800 to 2000 N/m. In this connection 20 mm strips of the laminate is used, the strips are conditioned at 20° C. and the measurements are performed at a speed of 100 mm/min and an angle of 180° (with support).

An excellent result which is usable for packaging purposes is achieved if the tensile strength before autoclaving is less than 500 N/m and after autoclaving is greater than 800 N/m.

We claim:

1. Method for forming a container wherein a barrier layer of less than 25 micrometers is fastened to an adjacent laminate layer in a package material and the fastening is partially carried out in a first step by achieving an adherence, then the package material is folded to form said container and, then the fastening is completed by means of heat treatment.

2. Method as claimed in claim 1, wherein the adherence is achieved by means of extrusion.

3. Method as claimed in claim 1, wherein the adherence is achieved by means of pasting.

4. Method as claimed in claim 1, wherein the adherence is achieved by means of heat lamination.

5. Method as claimed in claim 1, wherein the barrier layer comprises a material selected from the group including aluminium, a silica oxide coating, an aluminium oxide coating, ethylene/vinyl alcohol, polyvinyl alcohol, metalized oriented polyester and metalized oriented polypropylene.

6. Method as claimed in claim 1, wherein the laminate layer is achieved on both sides of the barrier layer.

7. Method as claimed in claim 1, wherein the laminate layer is selected from the group including an adhesive plastic, a heat sealable plastic, a primer and a lacquer.

8. Method as claimed in claim 1, wherein the heat treatment is accomplished by means of moist heat.

9. Method as claimed in claim 8, wherein the heat treatment is accomplished by means of autoclaving.

* * * * *